(12) United States Patent
Hsu et al.

(10) Patent No.: US 9,365,429 B2
(45) Date of Patent: Jun. 14, 2016

(54) GRAPHENE SCREENING AND SEPARATION METHOD AND DEVICE

(71) Applicant: METAL INDUSTRIES RESEARCH&DEVELOPMENT CENTRE, Kaohsiung (TW)

(72) Inventors: Tai-Hsin Hsu, Kaohsiung (TW); Wen-Bin Jian, Hsinchu (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 470 days.

(21) Appl. No.: 14/065,591

(22) Filed: Oct. 29, 2013

(65) Prior Publication Data

US 2014/0124371 A1      May 8, 2014

(30) Foreign Application Priority Data

Nov. 5, 2012   (TW) .............................. 101141005 A

(51) Int. Cl.
   *B03C 5/02*       (2006.01)
   *C01B 31/04*      (2006.01)
   *B03C 5/00*       (2006.01)

(52) U.S. Cl.
   CPC ............. *C01B 31/0484* (2013.01); *B03C 5/005* (2013.01); *B03C 5/022* (2013.01)

(58) Field of Classification Search
   CPC ................... B03C 5/00–5/028; C01B 31/0484
   USPC .................................. 204/547, 549, 643, 645
   See application file for complete search history.

(56) References Cited

U.S. PATENT DOCUMENTS

2011/0089404 A1*  4/2011  Marcus .................. B82Y 30/00
                                                         257/29

FOREIGN PATENT DOCUMENTS

| TW | I262170    | 9/2006 |
| TW | 201108311  | 3/2011 |
| TW | 201206824  | 2/2012 |

OTHER PUBLICATIONS

Alexander A. Green and Mark C. Hersam, "Emerging Methods for Producing Monodisperse Graphene Dispersions", Jan. 21, 2010, vol. 1, No. 2, The Journal of Physical Chemistry Letters.

* cited by examiner

*Primary Examiner* — Bach Dinh
(74) *Attorney, Agent, or Firm* — WPAT, PC; Justin King

(57) ABSTRACT

A graphene screening and separation method comprises the following steps. At least one pair of electrodes and an energy barrier layer is provided, wherein the pair of electrodes is a first electrode and a second electrode, and the energy barrier layer is formed on the first electrode. The pair of electrodes and the energy barrier layer are covered with a graphene suspension. When a graphene sheet in the graphene suspension materially couples the second electrode and the energy barrier layer and is located above the first electrode, a bias voltage between the first electrode and the second electrode of the pair of electrodes is changed and a corresponding tunneling current is measured. Screening and separation are performed by using differential conductance (i.e., the derivative of the tunneling current with respect to the bias voltage) of different layers of graphene.

15 Claims, 6 Drawing Sheets

GRAPHENE SCREENING AND SEPARATION METHOD AND DEVICE

CROSS-REFERENCE TO RELATED APPLICATION

This application claims the benefit of Taiwan Patent Application No. 101141005, filed on Nov. 5, 2012, which is hereby incorporated by reference for all purposes as if fully set forth herein.

BACKGROUND OF THE INVENTION

1. Field of the Invention

The present invention relates to a graphene screening and separation method, and more particularly to a graphene screening and separation device.

2. Related Art

Graphene is a single planar sheet of sp2-bonded carbon atoms, that are packed in a honeycomb crystal lattice. The multi-layer graphene is a layer by layer three-dimensional structure.

Both mechanical strength and flexibility of the graphene are better than those of the transparent indium tin oxide (ITO) material, and thus the transparent conductive electrode can replace the ITO with the graphene. The transparent conductive electrode requires 3 to 5 layers of graphene for concerning transmission coefficient and surface resistance.

The charging interval of super-capacitors made of graphene only requires 1 millisecond. The specific surface area of single-layer graphene can reach 2630 $m^2/g$, which is a very good energy storage material for the super-capacitor. In use, the ideal material for the super-capacitor is single layer graphene.

The graphene can replace silicon, and is applied to the field of transistors. In use, the material of transistor requires 1 to 2 layers of graphene, which can increase the transistor speed to the THz level.

The negative electrodes of lithium-ion batteries which are made by graphene can significantly improve the battery performance. In use, the battery negative electrode requires 3 to 4 layers of graphene with cavities there-between. The battery negative electrode using graphene material has higher output power density in a low temperature environment, and its performance is not easily deteriorated when charged and discharged repeatedly.

The above products require a particular number of graphene layers material, and in the current process technology, its purity has not yet been focused on the particular number of graphene layers. Therefore, the particular number of graphene layers must be separated with identification as well as separation and purification methods.

The conventional method for identifying the number of graphene layers is an optical method. There are other methods. For example, the number of graphene layers is identified with Quantum Hall effects, so as to distinguish single-layer graphene from double-layer graphene. The disadvantage is that the identification of the number of graphene layers with Quantum Hall effects needs to be carried out in a high magnetic field environment and thus is impractical and inefficient. Alternatively, the number of graphene layers is identified with Raman spectrum. For instance, scattered photons are measured after phonons and photons are interacted, and the thickness is identified according to Raman spectrum of graphene. The disadvantage is that differences between two layers and a few layers of graphene sheets are not obvious in Raman spectra.

Alternatively, the number of graphene layers is identified with contrast spectrum. For example, under irradiation of a white light source, the obtained reflection spectra were compared with that of a background spectrum from $SiO_2/Si$ to generate the contrast spectra. The disadvantage is that the contrast can be displayed only for a particular thickness and a substrate made of a particular material, which is difficult to be combined with the existing separation system.

The conventional method of separating and purifying graphene layers is density gradient ultracentrifugation. For instance, graphene suspension is formed by using amphiphilic surfactant sodium cholate, and the graphene layers are separated with density gradient ultracentrifugation. This method solves the problem of the coupling effect between area and thickness polydispersity in general gravity centrifugation. The disadvantage is that batch separation of different layers of graphene has a bottleneck in purity upgrade, and currently the single-layer graphene may reach about 85% by this method.

As stated above, the optical method is a relatively practical method of identifying the number of graphene layers currently. However, when the particular number of graphene layers is to be separated from the graphene suspension, the density gradient ultracentrifugation is mostly used. Although the optical method of identifying the number of graphene layers is clear, to separate a particular number of graphene layers is still from other method.

Therefore, there is a requirement to provide a screening and separation method and device for graphene to solve the problems.

SUMMARY OF THE INVENTION

The present invention is to provide a graphene screening and separation method, which can determine the number of graphene layers by measuring a tunneling current.

The graphene screening and separation method comprises the following steps. At least one pair of electrodes and an energy barrier layer is provided, wherein the pair of electrodes is a first electrode and a second electrode, and the energy barrier layer is formed on the first electrode. The pair of electrodes and the energy barrier layer are covered with a graphene suspension. When a graphene sheet in the graphene suspension materially couples the second electrode and the energy barrier layer and is located above the first electrode, a bias voltage between the first electrode and the second electrode of the pair of electrodes is changed and a corresponding tunneling current is measured. Screening and separation are performed by using differential conductance (i.e., a derivative of the tunneling current with respect to the bias voltage) of different layers of graphene.

The screening and separation method of the present invention can determine the number of graphene layers by measuring the tunneling current after using array electrodes with energy barrier layers formed by metal oxides to adsorb graphene with a dielectrophoretic force. The dielectrophoretic force can be continuously applied according to a particular number of graphene layers, or the dielectrophoretic force can be stopped, so that the particular number of graphene layers can be retained on the pair of electrodes, or the particular number of graphene layers can be released from the pair of electrodes, so as to finish the screening and separation method.

The present invention is further described in detail below with reference to the accompanying drawings.

DETAILED DESCRIPTION OF THE EMBODIMENTS

Figure 1:
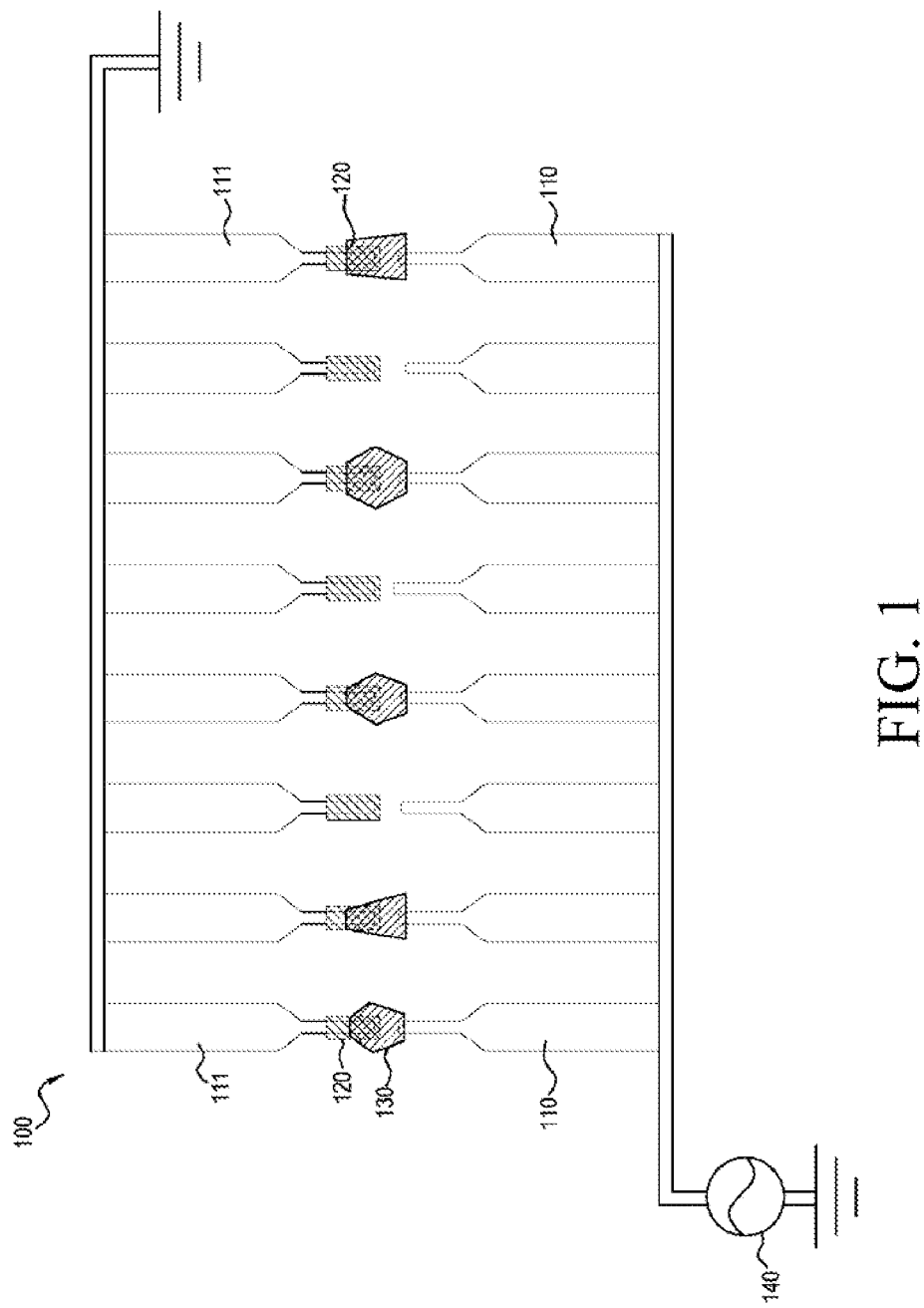
FIG. 1 is a schematic top view of a graphene screening and separation device illustrating an embodiment of the present invention.
Figure 2:
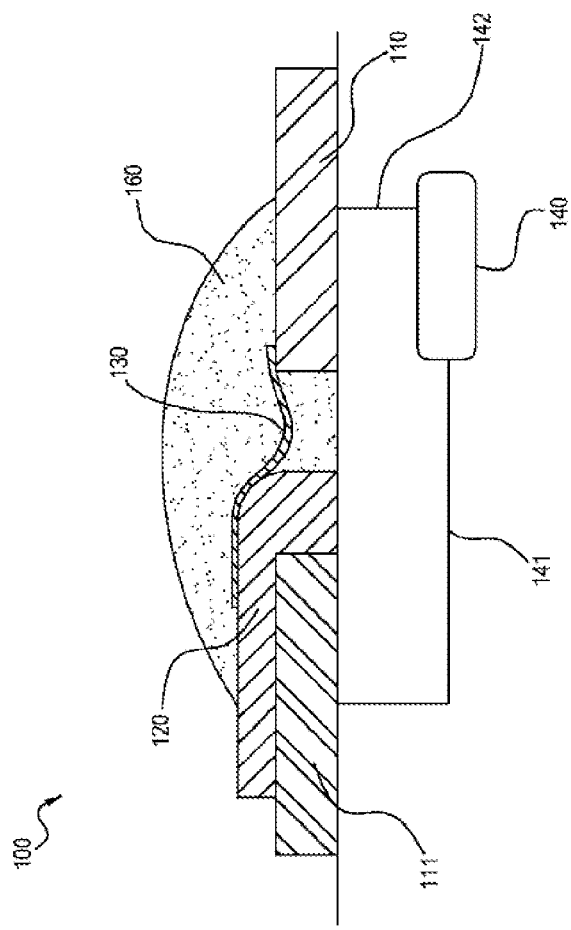
FIG. 2 is a schematic cross-sectional view of a graphene screening and separation device illustrating an embodiment of the present invention, which shows that the graphene screening and separation device includes a time-varying voltage source.

FIG. 1 and FIG. 2 show a graphene screening and separation device 100 illustrating an embodiment of the present invention. The graphene screening and separation device 100 includes at least one pair of electrodes, for example, multiple pairs of electrodes are arranged in an array, which is referred to as array electrodes. Each pair of electrodes consists of first and second electrodes 111, 110, and is covered by a graphene suspension 160. In this embodiment, the first and second electrodes 111, 110 can be metal electrodes.

Each pair of electrodes (the first and second electrodes 111, 110) can be independent and is electrically coupled to a time-varying voltage source 140 (i.e., AC power source) by wires 141, 142, so as to generate a dielectrophoretic force between the first and second electrodes 111, 110, to adsorb a graphene sheet 130 in the graphene suspension 160. The dielectrophoretic force is mainly generated from the graphene sheet with polarity asymmetrically induced from different dielectric properties (conductivity and permittivity) between the graphene sheet and the graphene suspension under a non-uniform alternating electric field. Also, the graphene sheet, after being subject to the dielectrophoretic force, may move toward to positions with high or low electric field intensities and become separated.

Figure 3:
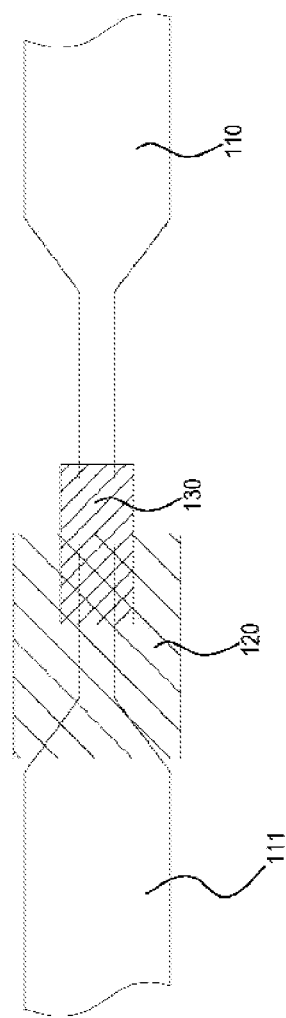
FIG. 3 is a schematic top view of a pair of electrodes, an energy barrier layer and a graphene sheet illustrating an embodiment of the present invention.
Figure 4:
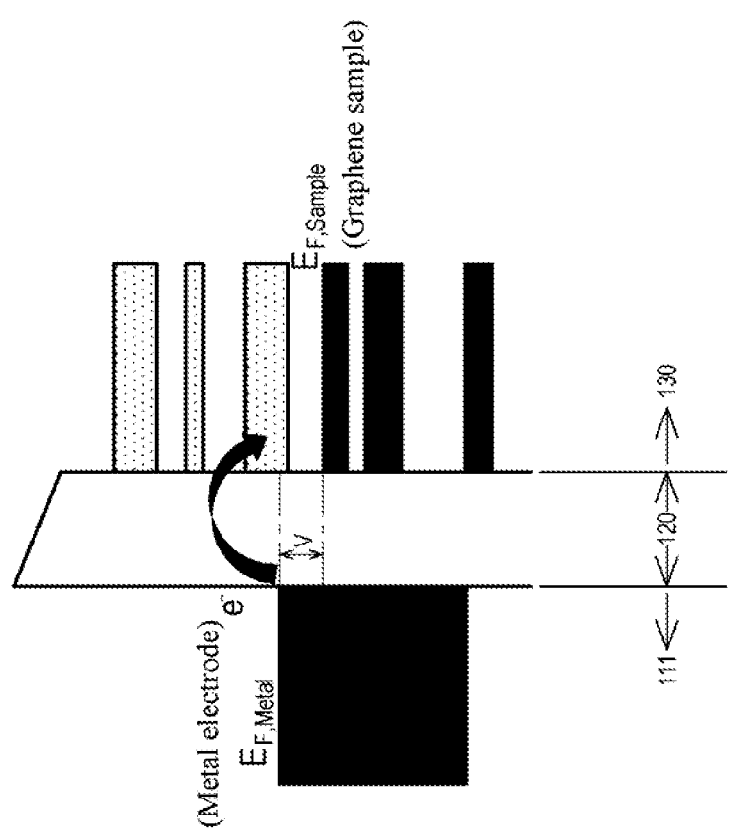
FIG. 4 is a schematic view illustrating that an appropriate thickness of a metal oxide according to an embodiment of the present invention can make the graphene sheet and the electrode generate a tunneling current there between after being supplied by a bias voltage.

Referring to FIG. 3 and FIG. 4, at least one energy barrier layer (for example, a metal oxide 120 made of $Al_2O_3$) is formed (for example, by sputtering) on the first electrode 111 of the pair of electrodes, and is also covered by the graphene suspension. When one graphene sheet 130 materially couples the second electrode 110 and the metal oxide 120 and is located above the first electrode 111, an appropriate thickness of the metal oxide 120 may make the graphene sheet 130 and the first electrode 111 generate a tunneling current therebetween after supplying a bias voltage. The tunneling current refers the electrons tunnel through the energy barrier layer. The tunneling current and the density of state have the following relations:

$$I \propto \int_0^{eV} \rho_{Metal}(E_F + E)\rho_{Sample}(E_F - eV + E)dE \quad (1\text{-}1)$$

$$\frac{dI}{dV} \propto \rho_{Sample}(E_F - eV) \quad (1\text{-}2)$$

where I denotes tunneling current, E denotes energy of charged particle, $E_F$ denotes Fermi energy, $\rho_{Metal}$ denotes density of state of the metal electrode, $\rho_{Sample}$ denotes density of state of the graphene sample and V denotes a bias voltage.

Formula (1-2) can be deduced from formula (1-1). According to formula (1-2), the density of state of different layers of graphene is different, the measurement result of the differential conductance, e.g., the derivative (dI/dV) of the tunneling current with respect to the bias voltage (i.e., the tunneling current differentiated by the bias voltage) may differ, and dI/dV values of different layers of graphene may be obtained from such relations.

Figure 5:
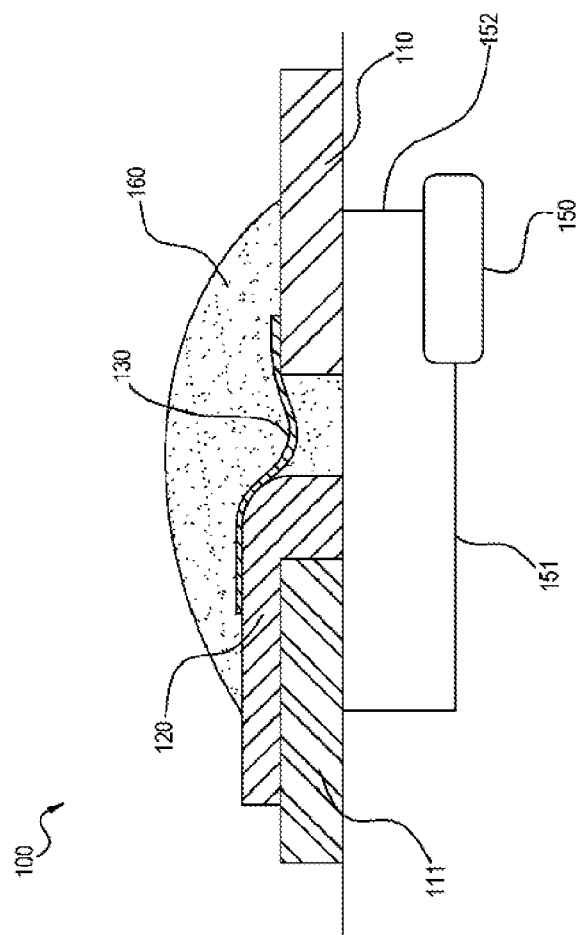
FIG. 5 is a schematic cross-sectional view of a graphene screening and separation device illustrating an embodiment of the present invention, which shows that the graphene screening and separation device includes a measurement unit comprised of a voltage source and a nanoamp current meter.

Referring to FIG. 5, each pair of electrodes can be independently electrically coupled to a measurement unit 150 comprised of a voltage source and a nanoamp current meter. After the first and second electrodes of the pair of electrodes adsorbs the graphene sheet 130, the measurement unit 150 can change the bias voltage V between the first and second electrodes 111, 110, and measure a corresponding tunneling current I by means of the wires 151 and 152, so as to obtain a change graph of the derivative (dI/dV) of the tunneling current with respect to the bias voltage versus the bias voltage V. As the tunneling current flowing through graphene is relevant to the density of state of the graphene sheet, that is, the density of state of different layers of graphene should differ, the number of graphene layers can be determined according to the tunneling current measured by the measurement unit 150.

Figure 6:
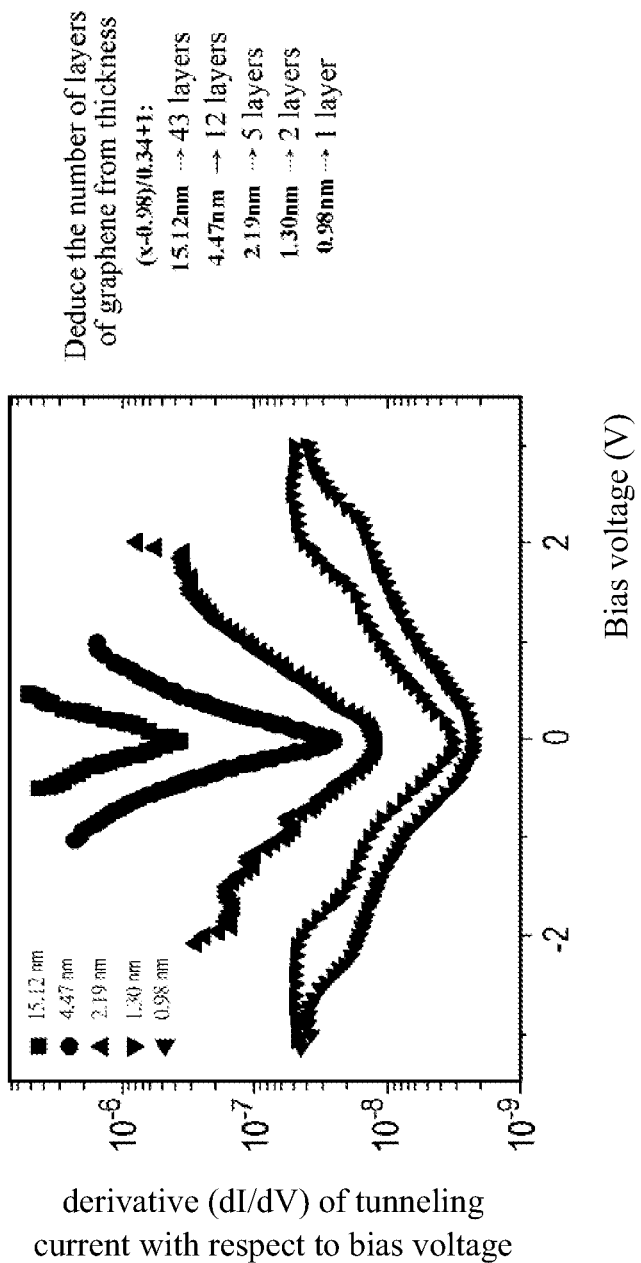
FIG. 6 illustrates measurement results of differential conductance of different layers of reduced graphene oxides adsorbed on the electrodes.

FIG. 6 illustrates measurement results of the derivative (dI/dV) of the tunneling current with respect to the bias voltage of different layers (thicknesses) of reduced graphene oxide adsorbed on the pair of electrodes. For example, the thickness difference of 0.98 nm and 1.30 nm from the experimental measurement with inaccuracy should be one-layer graphene (the thickness of the single-layer graphene is 0.34 nm), and five corresponding thicknesses (I-V) still can be clearly identified from five curves of the derivative (dI/dV) of the tunneling current with respect to the bias voltage. The formula calculating the number of graphene layers from the thickness of graphene may be: [(the thickness of graphene) minus 0.98 nm]/0.34 nm plus 1, the deduction of which is as follows:

| | Thickness of Graphene → Number of Graphene Layers |
|---|---|
| I | 15.12 nm → 43 layers |
| II | 4.47 nm → 12 layers |
| III | 2.19 nm → 5 layers |
| IV | 1.30 nm → 2 layers |
| V | 0.98 nm → 1 layer |

As different thicknesses (number of layers) have different energy band structures, resulting in different electronic properties, screening and separation can be performed by using differential conductance between tunneling currents of different layers of graphene.

In short, a graphene screening and separation method of the present invention includes the following steps: providing at least one pair of electrodes and an energy barrier layer, wherein the pair of electrodes is a first electrode and a second electrode, and the energy barrier layer is formed on the first electrode; covering the pair of electrodes and the energy barrier layer with a graphene suspension; changing a bias voltage between the first electrode and the second electrode of the pair of electrodes and measuring a corresponding tunneling current when a graphene sheet in the graphene suspension materially couples the second electrode and the energy barrier layer and is located above the first electrode; and performing screening and separation by using differential conductance (i.e., the derivative of the tunneling current with respect to the bias voltage) of different layers of graphene.

The screening and separation method of the present invention can determine the number of graphene layers by measuring the tunneling current after using containing metal oxides array electrodes to adsorb graphene with the dielectrophoretic force. The dielectrophoretic force can be continuously applied according to a particular number of graphene layers, or the dielectrophoretic force can be stopped, so that the particular number of graphene layers can be retained on the pair of electrodes, or the particular number of graphene layers can be released from the pair of electrodes, so as to finish the screening and separation method.

The above descriptions are merely implementation manners or embodiments of the present invention for solving the problem. Any equivalent variations and modifications consistent with the literal meaning of the present invention or made according to the scope of the present invention belong to the claims of the present invention.

What is claimed is:

1. A graphene screening and separation method, comprising:
    providing at least one pair of electrodes and an energy barrier layer, wherein the pair of electrodes is a first electrode and a second electrode, and the energy barrier layer is formed on the first electrode;
    covering the pair of electrodes and the energy barrier layer with a graphene suspension;
    changing a bias voltage between the first electrode and the second electrode of the pair of electrodes and measuring a corresponding tunneling current when a graphene sheet in the graphene suspension materially couples the second electrode and the energy barrier layer and is located above the first electrode; and
    performing screening and separation by using differential conductance of different layers of graphene.

2. The graphene screening and separation method of claim 1, wherein the differential conductance is a derivative of the tunneling current with respect to the bias voltage.

3. The graphene screening and separation method of claim 2, further comprising:
    generating at least one graph of the derivative of the tunneling current with respect to the bias voltage versus the bias voltage between the first electrode and the second electrode of the pair of electrodes.

4. The graphene screening and separation method of claim 3, wherein the graphs of different layers of graphene are collected to be a graph set.

5. The graphene screening and separation method of claim 2, wherein each pair of electrodes is electrically coupled to a time-varying voltage source, so as to form a dielectrophoretic force between the first electrode and the second electrode of the pair of electrodes, so that the graphene sheet of the graphene suspension materially couples the second electrode and the energy barrier layer and is located above the first electrode.

6. The graphene screening and separation method of claim 5, wherein the dielectrophoretic force is applied for a particular number of graphene layers, so as to retain the particular number of graphene layers on the pair of electrodes.

7. The graphene screening and separation method of claim 5, wherein the dielectrophoretic force is stopped according to a particular number of graphene layers, so as to release the particular number of graphene layers from the pair of electrodes.

8. The graphene screening and separation method of claim 1, wherein the energy barrier layer is made by a metal oxide.

9. The graphene screening and separation method of claim 8, wherein the metal oxide is aluminum oxide.

10. A graphene screening and separation device, comprising:
    at least one pair of electrodes, wherein each pair of electrodes consists of a first electrode and a second electrode;
    at least one energy barrier layer formed on the first electrode; and
    a measurement unit comprised of a voltage source and a nanoamp current meter electrically coupled to the first and second electrodes of the pair of electrodes, wherein when a graphene sheet in a graphene suspension covers the second electrode and the energy barrier layer and is located above the first electrode, a corresponding tunneling current is measured according to a bias voltage between the first electrode and the second electrode of the pair of electrodes.

11. The graphene screening and separation device of claim 10, wherein the pair of electrodes is covered by the graphene suspension.

12. The graphene screening and separation device of claim 10, wherein the energy barrier layer is covered by the graphene suspension.

13. The graphene screening and separation device of claim 10, wherein each pair of electrodes is electrically coupled to a time-varying voltage source, so as to form dielectrophoretic force between the first electrode and the second electrode of the pair of electrodes, so that the graphene sheet of the graphene suspension materially couples the second electrode and the energy barrier layer and is located above the first electrode.

14. The graphene screening and separation device of claim 10, wherein the energy barrier layer is a metal oxide.

15. The graphene screening and separation device of claim 14, wherein the metal oxide is aluminum oxide.

* * * * *